United States Patent Office 3,158,664
Patented Nov. 24, 1964

3,158,664
POLYMER BLENDS CONSISTING OF A RIGID VINYL CHLORIDE POLYMER AND A RUBBERY INTERPOLYMER OF ISOBUTYLENE AND BUTADIENE OR ISOPRENE AND PROCESS OF PREPARING THE SAME
Massimo Baer, Longmeadow, Mass., assignor to Monsanto Company, a corporation of Delaware
No Drawing. Filed Dec. 22, 1958, Ser. No. 781,862
1 Claim. (Cl. 260—888)

This invention relates to polymer blends and more particularly to blends of a rigid vinyl chloride polymer and a rubbery polymer of isobutylene.

It is known that blends of rigid vinyl chloride polymers with certain rubbery diene polymers, particularly butadiene-acrylonitrile interpolymers, have desirable physical properties. Specifically, such polymer blends have higher impact strengths and lower processing temperatures than the rigid vinyl chloride polymer included therein. A major shortcoming of such polymer blends is that their impact strength is very sensitive to the degree of mechanical work done on the polymer blend and drops drastically if the polymer blend is overworked. Thus, the polymer blend contained in fabricated particles which fail to meet manufacturing specifications cannot be reworked and/or reused. This represents a serious loss of material, for it is not uncommon for 10–15% of the output of a plastic fabricator to fall outside of manufacturing specifications.

Accordingly, it is an object of this invention to provide novel blends of thermoplastic materials consisting predominantly of a rigid vinyl chloride polymer.

Another object of this invention is to provide novel blends of thermoplastic materials consisting predominantly of a rigid vinyl chloride polymer, which blends are relatively insensitive to the degree of mechanical work performed thereon.

Other objects and advantages of this invention will be apparent from the following detailed description thereof.

The above and other related objects are attained by preparing polymer blends consisting of a major amount of a rigid vinyl chloride polymer and a lesser amount of a rubbery isobutylene polymer.

The following examples and descriptions are set forth to illustrate more clearly the principle and practice of this invention to those skilled in the art. Where parts or quantities are mentioned, they are parts or quantities by weight.

EXAMPLE I

A blend of 90 parts of a vinyl chloride homopolymer (having a specific viscosity of about 0.48 as measured in an 0.4% solution in cyclohexanone at 25° C.) and 10 parts of Butyl rubber (an interpolymer of approximately 98% isobutylene and 2% isoprene) is prepared. The entire 90 parts of vinyl chloride homopolymer, 2.0 parts of a tin mercaptide stabilizer, 0.5 part of ditertiarybutyl catechol and 1 part of stearic acid are worked on a 2 roll rubber mill with the roll temperatures being maintained at 340° F. until a rolling bank is formed. Thereafter, the 10 parts of Butyl rubber are added on the mill and the entire blend is worked for 15 minutes. The polymer blend is then compression molded for 5 minutes at 185° C. and the physical properties of the resultant molding are set forth in the table below together with the corresponding values for the polyvinyl chloride homopolymer.

Table I

|  | Impact Strength, ft. lbs./inch of notch [1] | Tensile Strength, p.s.i. | Modulus, p.s.i. |
|---|---|---|---|
| Polymer Blend | 14 | 5,500 | 3.0×10⁵ |
| Polyvinyl Chloride | 0.5 | 8,000 | 3.8×10⁵ |

[1] Determined @ 25° C. by ASTM Method D256–47T employing a notch having a radius of curvature of 0.001″.

EXAMPLE II

An outstanding characteristic of the polymer blends of this invention is that their impact strength is not seriously affected by the degree of mechanical work done on the blend. To illustrate this fact, aliquots of the polymer blend prepared in Example I are prepared and milled for, respectively, 15, 25, and 40 minutes on a rubber mill with the rolls being maintained at 340° F. The impact strength of compression molded samples of each of these aliquots is substantially identical with the value reported in Table I.

For purposes of comparison, a blend of 90 parts of the vinyl chloride homopolymer employed in Example I and 10 parts of a butadiene-acrylonitrile rubber (containing 21% acrylonitrile) is prepared. After 2 minutes of working on a rubber mill (roll temperature—340° F.) the polymer blend has an impact strength of 20 ft. lbs./in. of notch. After 6 minutes of working on the mill, the impact strength of the blend falls to 10 ft. lbs./in. of notch and after 10 minutes of working the impact strength falls to 1.0 ft. lb./in. of notch.

The vinyl chloride polymer included in the polymer blends of this invention may be any rigid vinyl chloride polymer such as vinyl chloride homopolymers and interpolymers of vinyl chloride with interpolymerizable monomers such as vinyl acetate, vinylidene chloride, acrylonitrile, acrylate and methacrylate esters, e.g., methyl acrylate, methyl methacrylate, butyl methacrylate, etc. In general, where vinyl chloride interpolymers are employed, they should contain at least about 80 weight percent of vinyl chloride. To obtain optimum properties in the polymer blends, the vinyl chloride polymer included therein should have a relatively high molecular weight, e.g., the polymers should have a specific viscosity of at least about 0.4 as determined in an 0.4 weight percent solution in cyclohexanone at 25° C.

The rubbery isobutylene polymer included in the polymer blends of the invention is selected from the group consisting of homopolymers of isobutylene and interpolymers of isobutylene which contain up to 10 weight percent of a conjugated 1,3-diene such as butadiene or isoprene. The isobutylene polymer employed should have a molecular weight of at least 1,000 and preferably at least 20,000 and may have a molecular weight of 300,000 or even higher. The principal examples of such rubbery isobutylene polymers are the polyisobutylene polymers sold under the trade name "Vistanex" and the interpolymers of isobutylene and isoprene as exemplified by Butyl rubber.

The polymer blends of the invention are an intimate binary fusion blend of the rigid vinyl chloride polymer and the rubbery isobutylene polymer. Specifically, the two polymers must be comalaxated on conventional plastics working equipment such as rubber mills, Banbury mixers, extruders, etc. at an elevated temperature for a period of time sufficient to fuse the polymers and form an intimate physical admixture thereof having a minimum impact strength of at least 4.0 ft. lbs./in. of notch @ 25° C. as determined by ASTM Method D256-47T employing a notch having a radius of curvature of 0.001". With the polymer blends of this invention, this period of time is usually considerably longer than is required for prior art blends of rigid vinyl chloride polymers and previously employed elastomers such as the butadiene-acrylonitrile interpolymers. In general, when employing a 2 roll rubber mill, it is usually necessary to work the polymer blend for at least about 10 minutes with the roll temperatures being set at a temperature of 300-375° F. The precise time of working required for any particular polymer blend with any specific mixing equipment can be readily determined through routine experimentation. The polymer blends of the invention ordinarily will contain about 70-99 parts of the rigid vinyl chloride polymer and, correspondingly, about 30-1 parts of the rubbery isobutylene polymer with the preferred polymer blends of the invention containing about 80-95 parts of the rigid vinyl chloride polymer and, correspondingly, 20-5 parts of the rubbery isobutylene polymer.

In addition to the rigid vinyl chloride polymer and the rubbery isobutylene polymer, the polymer blends of the invention ordinarily will contain conventional stabilizers and antioxidants of the type employed with vinyl chloride polymers. If desired, plasticizers, colorants, pigments, fillers, etc. also may be included in the polymer blends.

The polymer blends may be readily molded, calendered or extruded into diverse shapes and forms such as rods, tubes, sheets, film, filaments, etc. by techniques well known in the polymer art. The polymer blends are especially useful in the manufacture of plastic pipe.

The above descriptions and particularly the examples are set forth by way of illustration only. Many other variations and modifications thereof will be obvious to those skilled in the art and can be made without departing from the spirit and scope of the invention herein described.

What is claimed is:

A method for preparing intimate binary fusion blends which consists of comalaxating a mixture of 80-95 parts by weight of a rigid vinyl chloride polymer and, correspondingly, 20-5 parts by weight of a rubbery interpolymer of at least 90 weight percent of isobutylene and, as the only other component of the interpolymer, up to 10 weight percent of a conjugated diene of the group consisting of isoprene and butadiene for at least 10 minutes at a temperature of 300-375° F.

References Cited in the file of this patent

UNITED STATES PATENTS

| | | |
|---|---|---|
| 2,247,064 | Nowak | June 24, 1941 |
| 2,624,682 | Hazeltine | Jan. 6, 1953 |
| 2,739,082 | Bezman et al. | Mar. 20, 1956 |
| 2,769,789 | Madge et al. | Nov. 6, 1956 |
| 2,858,292 | Swart et al. | Oct. 28, 1958 |
| 2,901,458 | Banes et al. | Aug. 25, 1959 |
| 3,005,796 | Dreisbach et al. | Oct. 24, 1961 |
| 3,019,209 | Reid et al. | Jan. 30, 1962 |

FOREIGN PATENTS

| | | |
|---|---|---|
| 711,853 | Great Britain | July 14, 1954 |

OTHER REFERENCES

Smith: India Rubber World, vol. 129, pages 785-6, March 1954.